March 17, 1964     J. L. JOHNSON     3,125,026
REFLECTED ELECTRIC WAVE ACTUATED DETONATOR
Filed July 28, 1945
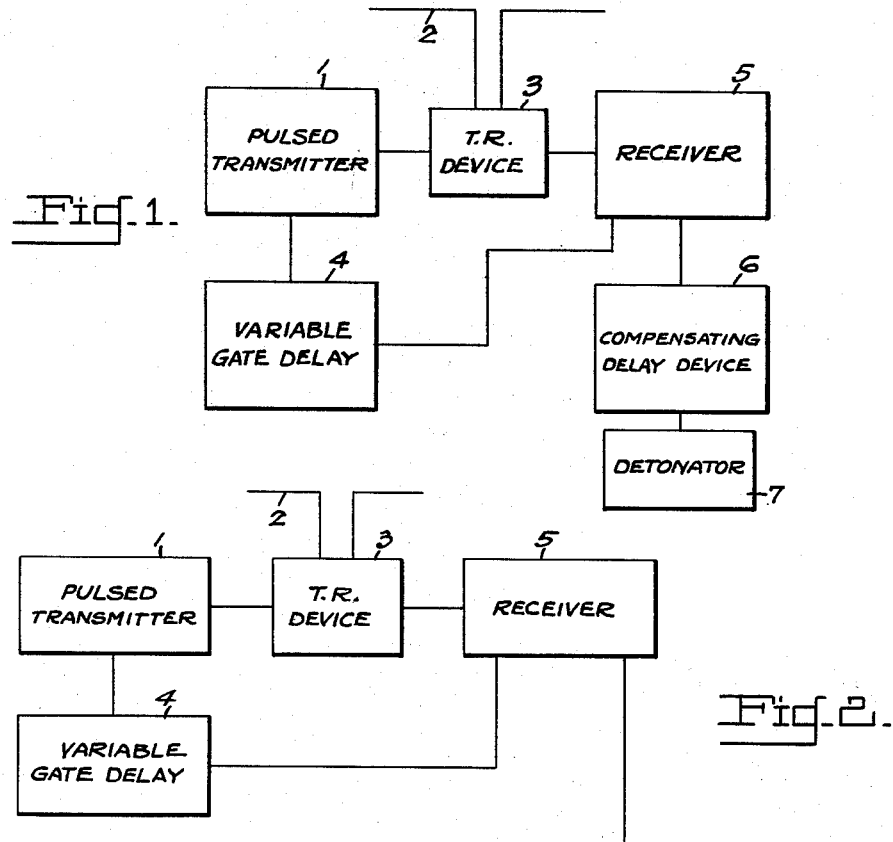
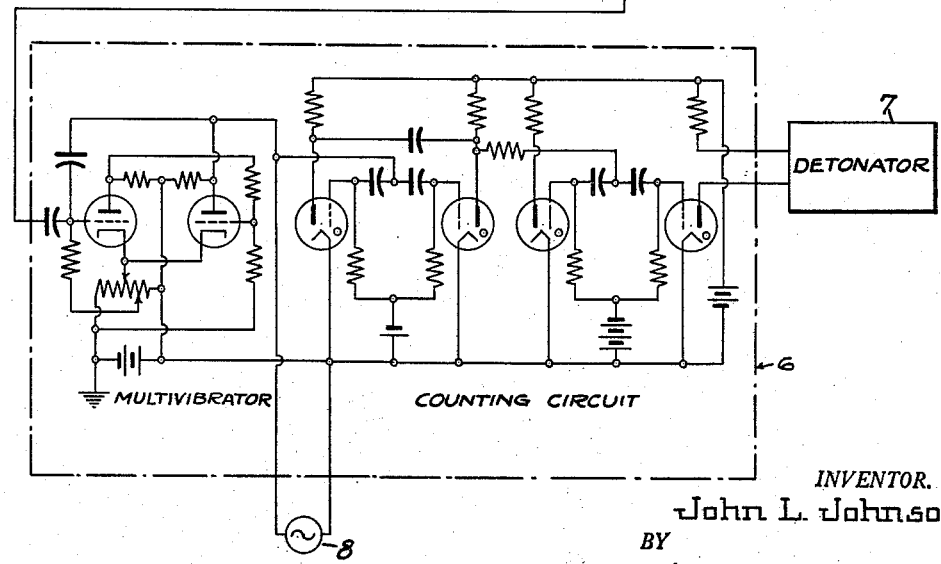
INVENTOR.
John L. Johnson
BY
G. J. Kessenich & A. W. Dew
ATTORNEYS

United States Patent Office 3,125,026
Patented Mar. 17, 1964

3,125,026
REFLECTED ELECTRIC WAVE ACTUATED DETONATOR
John L. Johnson, Catonsville, Md., assignor, by mesne assignments, to the United States of America as represented by the Secretary of the Army
Filed July 28, 1945, Ser. No. 607,641
4 Claims. (Cl. 102—70.2)

My invention relates to devices such as rockets, bombs, shells, or the like, which are arranged to be exploded, to release a parachute, or to actuate some other indicating or control apparatus at a predetermined distance by the coaction of electric waves generated on the device with electric waves reflected from a target.

In accordance with recent developments in the electromagnetic wave art, bombs and the like are caused to explode at a desired predetermined distance from a target by equipping the bomb with a transmitter which emits electromagnetic waves preferably of ultra-short length, while the bomb is approaching the target, these waves being reflected by the target back to the bomb which is equipped with a receiver adapted to respond only to those reflected waves which meet the bomb at a predetermined distance from the target. The receiver thereupon immediately detonates an explosive charge in the bomb. Specifically, the response of the receiver to reflected waves at the desired distance from the target is brought about by disabling the circuits of the receiver from responding to incoming waves which have taken longer than a preselected time to traverse the path from the transmitter to the target and back again to the bomb. This result is brought about in ways well known to those skilled in the art by having the transmitter impress on the receiver a so-called "gating" pulse to render the receiver sensitive to incoming radiation only after the lapse of a predetermined time delay after the emission of each pulse by the transmitter. The bomb will, therefore, explode at a distance from the target which is equal to one-half the distance which radiant energy traverses during the time delay interval just mentioned.

However, since the receiver on the bomb is closely adjacent to the transmitter, it is naturally affected not only by the electromagnetic waves reflected from the target, but also by the direct radiation from the transmitter unless some arrangement is provided to disable the receiver throughout the period in which each pulse is being emitted by the transmitter. Such arrangements have come to be well known in the art under the name TR device or TR box. In the operation of the conventional system of the present day, therefore, the following sequence of events occurs. First the receiver is rendered inoperative during a definite time period during which the transmitter sends out a wave pulse. A pulse from the transmitter is likewise sent through a time delay circuit which imposes a voltage pulse, after a predetermined interval, on the receiver, to enable the latter to respond to any waves incident upon its antenna. During this time delay the pulse sent out from the transmitter travels to the target and is reflected. If the distance of the bomb from the target is such that the reflected wave fails to arrive during the short interval of time when the "gating" pulse is impressed by the output of the delay circuit on the receiver, the latter is insensitive to the arrival of the reflected waves. However, as the bomb moves nearer to the target, the time interval during which the pulse is traveling the distance from the transmitter to the target and back to the receiver changes, and ultimately becomes equal to the time delay produced on the "gating" pulse by the time delay network above mentioned. As such time the reflected pulse will arrive at the receiver at a time when it is capable of responding to incoming energy, and the resulting output current in the receiver is caused to detonate the bomb. The distance of the bomb from the target at this time is obviously equal to one-half the distance traversed by electromagnetic radiation during the delay interval for which the time delay "gating" circuit is set, and this "gating" circuit is accordingly made variable to predetermine at will the distance from the target at which the bomb will explode.

There is a minimum limit to the left delay which may be imposed upon the receiver after the transmitter begins to emit the radiation pulse for the reason that, as has previously been pointed out, the receiver must be kept in a disabled condition by the TR device for an interval at least equal to the length of the pulse being emitted by the transmitter. Furthermore, it is found that in practical receivers the presence of necessary resonant circuits maintains the receiver in a responsive condition for an interval slightly longer than the actual duration of one pulse of the transmitter. This may be thought of as equivalent to the presence on the transmitted pulse of a lengthening tail which makes it impossible to render the receiver sensitive to incoming radiation until the tail has disappeared.

It is, therefore, evident that there is a minimum time delay which must be imposed by the time delay "gating" circuit if the system is to be operative; and correspondingly there is a minimum distance from the target at which it is possible to detonate a bomb. In a practical circuit with which I am familiar employing a transmitted pulse of one microsecond duration, this minimum distance is of the order of 600 feet.

It is accordingly one object of my invention to provide a system in which reflected waves coact with directly transmitted wave pulses to energize a receiver, in which system the limit as to a minimum length of path for reflected waves at which the system is operable can be substantially eliminated.

It is another object of my invention to provide a projectile control system in which work circuits may be caused to perform a desired function when the bomb is separated from the target by any distance however short.

Other objects of my invention will become apparent upon reading the following description taken in connection with the accompanying drawing, in which FIGURE 1 is a block diagram of a system embodying the principles of my invention, and FIGURE 2 the block diagram of FIGURE 1, but showing the schematic details of the compensating delay device.

Referring in detail to the drawings, I provide a pulse transmitter 1 capable of generating electromagnetic waves of any suitable frequency in pulses which are separated from each other by predetermined time periods. Usually, it will be found preferable for practical purposes that the generated waves shall be of ultra-high frequency, and that the length of each pulse is short compared with the intervals separating them. The pulse transmitter 1 is connected to an antenna 2 through a device 3 which may be referred to as a TR device, the purpose of which will be explained just below. The pulse transmitter 1 is likewise connected to deliver its voltage pulses through a variable time delay device circuit 4 which may, for example, be a multivibrator or other suitable time delay device of a type well known to those skilled in the art. The device 4 is one which has the properties of delivering at its output terminals an energy pulse, preferably square topped, at a predetermined interval after the incidence through its input circuit of the pulse from the transmitter 1. For example, multivibrators are well known which respond to the incidence of a voltage pulse on their input grids to produce a voltage pulse in their output circuit after a time interval which can be varied at will by adjustment of their circuit constants. The output of the variable circuit 4 which may be referred to as "gating" pulse is impressed upon the input circuit of a radio receiver 5. The radio receiver 5 is likewise connected to the antenna 2 through the TR device 3. The output circuit of the radio receiver 5 is connected to the input of a compensating delay device 6 which has the property of producing at its output terminals a voltage pulse following the pulse on its input circuit by a time interval which may either be a fixed quantity, or preferably a quantity made inversely proportional to the speed with which the bomb carrying the antenna 2 is approaching a target. The output pulse from the compensating device 6 is impressed upon some form of detonating device 7, of which many are well known in the art, which causes a detonating charge on the bomb.

The mode of operation of the arrangement shown in the drawings is substantially as follows. Each pulse generated by the transmitter 1 is passed through the TR device where it impresses a voltage on the receiver 5 which, in effect, short circuits the input terminals of the latter or at any rate renders any radiation incident upon the antenna 2 ineffective to operate the receiver 5. The energy pulse from the transmitter likewise passes from the TR device to the antenna 2 where it is radiated, travels to a target, is reflected and returns to the antenna 2.

The pulse generated by the transmitter 1 passes through the variable delay device 4 to the input circuit of receiver 5 and by reason of the adjustment of the delay device 4 always arrives there at a time after the transmitter 1 has completed the transmission of the pulse. The voltage impressed by the variable delay device 4 on the receiver 5 renders the latter responsive to any waves incident upon the antenna 2 for a time equal to the length of said voltage pulse. Since the receiver 5 does not become sensitive to incoming radiation until after a time equal to the length of the pulse generated by transmitter 1 plus the length of the tail characteristic of the resonant circuits of the receiver 5, it follows that the receiver 5 is always energized at a time when the bomb is separated from the target by a distance at least as great as the minimum range at which an ordinary prior art system could operate, this minimum range having already been described above.

However, instead of having the receiver immediately cause the detonator to explode the bomb at this distance, I interpose between the receiver and the detonator a second time delay device which has the properties of impressing upon the detonator 7 an operating pulse only after a time interval predetermined by the characteristics of the delay device 6. By making the time interval just mentioned equal to the time required by the bomb to traverse the minimum range which I have previously described as characteristic of bomb detonating systems, I insure that the bomb will explode when it has arrived at a distance from the target which is less than that at which the receiver 5 is energized by an amount equal to this minimum range. In other words, the delay device 6 compensates for the minimum range difficulty characteristic of prior art devices.

The delay device 6 may be of any type well known in the art; for example, it may comprise what may be termed a "flip flop" multivibrator connected to excite a counting circuit of which numerous types are well known in the art. The multivibrator may, for example, be of the type described in Section 10–8 of the "Theory and Applications of Electron Tube" by H. J. Reich; McGraw-Hill Book Company, New York, 1944, Second edition, which is adapted to produce a square-topped output voltage wave of substantially any desired length. The counting tube may, for example, be one of the type described in Section 12–32 of the same book, the bias voltage of the tripping circuit of the counter being so adjusted that no voltage impulses are produced in the output circuit of the counter except during each square-topped output voltage pulse impressed on the tripping circuit by the multivibrator. There is also impressed on this tripping circuit the output of an alternating current generator 8 which is either of constant speed, or preferably is driven by a propeller located in the air outside the bomb or projectile. Such a propeller will drive the alternating current generator at a frequency substantially proportional to the velocity at which the bomb is falling at any instant. The counter acts to produce an output voltage pulse after a predetermined number of cycles of said alternating current generator have energized its tripping circuit.

With the above-described arrangement, the multivibrator impresses a positive voltage pulse on the triggering circuit of the counter beginning at the instant that the receiver 5 produces a pulse in its output circuit and so energizes the counter for a predetermined period of time thereafter. During this predetermined period of time, the counter responds to produce a voltage pulse in its output circuit after a predetermined number of cycles have been impressed upon its triggering circuit by the above-mentioned alternating current generator.

Where the alternating current generator 8 is of the constant frequency type, a voltage pulse from the output circuit of the counting device will follow after a predetermined time the voltage pulse produced in the output circuit of the receiver 5.

Where the alternating current generator 8 is driven at a speed proportional to the velocity of movement of the bomb, the counter will produce an output pulse after a period of time which is inversely proportional to the velocity with which the bomb or projectile is falling. In the latter case, the voltage pulse in the output circuit of the counter will occur when the bomb or projectile has fallen a predetermined distance from its position at the time the voltage pulse was produced in the output circuit of the receiver 5. The detonator 7 is thus arranged to cause the bomb to explode when it has fallen a predetermined distance from the point at which the receiver 5 responded to the incidence of a pulse reflected from the target.

As has already been explained, the pulse in the output circuit of the receiver was arranged to occur when the bomb or projectile was at some predetermined distance away from the target. Since, as it has just been explained, the delay device causes the bomb to explode after it has fallen a known distance below the position at which the voltage pulse was produced in the output circuit of the receiver, the distance of the bomb from the target at the time of the explosion can be made anything which may be desired. Specifically, by making the distance through which the bomb falls after the voltage pulse is produced in the output circuit of the receiver equal to the distance separating the bomb from the target when the voltage pulse occurs in the output circuit of the receiver, the bomb may be made to explode at the very instant at which it reaches the target.

I claim as my invention:

1. A projectile comprising, means for detonating said projectile, means for radiating a wave pulse, means for producing an energy pulse on said projectile in response after a predetermined time following said emission to a reflection of said wave pulse, and means for actuating said detonating means after a predetermined interval subsequent to the production of said energy pulse.

2. In combination with a projectile, a detonating device, means for radiating a wave pulse from said projectile to a target, a receiver responsive after the lapse of a predetermined interval from the radiation of said pulse to waves reflected from said target, an output circuit for said receiver comprising a time delay device, and means energized from the output of said time delay device for actuating asid detonating device.

3. For use in detonating a projectile, a detonator, means for radiating a wave pulse, means for producing an energy pulse on said projectile in response to a reflection of said radiated pulse after a predetermined time following radiation of said pulse, and means for actuating said detonator at a time interval which is proportional to the velocity of movement of the projectile following the production of said energy pulse in response to a reflection of said radiated pulse.

4. For use in detonating a projectile, a detonating device, means for radiating a wave pulse, a receiver responsive to a reflection of said radiated pulse after the lapse of a predetermined interval from the radiation of said radiated pulse, an output circuit for said receiver comprising a time delay device, and means comprising said detonating device energized from the output of said time delay device after a time which is inversely proportional to the velocity of movement of said projectile.

References Cited in the file of this patent

UNITED STATES PATENTS

| | | |
|---|---|---|
| 2,055,883 | Terry | Sept. 29, 1936 |
| 2,060,198 | Hammond | Nov. 10, 1936 |
| 2,255,245 | Ferrel | Sept. 9, 1941 |
| 2,341,351 | Barkley | Feb. 8, 1944 |
| 2,371,988 | Granqvist | Mar. 20, 1945 |
| 2,403,567 | Wales | July 9, 1946 |
| 2,440,250 | Deloraine | Apr. 27, 1948 |
| 2,441,956 | Deloraine | May 25, 1948 |

FOREIGN PATENTS

| | | |
|---|---|---|
| 376,987 | Italy | Dec. 4, 1939 |